(12) United States Patent
Byun et al.

(10) Patent No.: US 8,535,828 B2
(45) Date of Patent: Sep. 17, 2013

(54) RECHARGEABLE BATTERY

(75) Inventors: Sang-Won Byun, Suwon-si (KR); Yong-Sam Kim, Suwon-si (KR); Masanori Kogure, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 791 days.

(21) Appl. No.: 12/632,614

(22) Filed: Dec. 7, 2009

(65) Prior Publication Data

US 2010/0143772 A1 Jun. 10, 2010

(30) Foreign Application Priority Data

Dec. 8, 2008 (KR) ........................ 10-2008-0124113

(51) Int. Cl.
 *H01M 2/00* (2006.01)
 *H01M 2/02* (2006.01)
 *H01M 2/12* (2006.01)

(52) U.S. Cl.
 USPC ............................. 429/163; 429/164; 429/53

(58) Field of Classification Search
 USPC ............................................. 429/164, 163, 53
 See application file for complete search history.

(56) References Cited

U.S. PATENT DOCUMENTS

| 5,707,756 | A | 1/1998 | Inoue |
| 5,879,832 | A * | 3/1999 | Vu et al. .......................... 429/62 |
| 6,537,693 | B1 | 3/2003 | Suzuki et al. |
| 6,620,544 | B1 | 9/2003 | Shin et al. |
| 7,618,745 | B2 | 11/2009 | Yamashita et al. |
| 2003/0027038 | A1 | 2/2003 | Tsukamoto et al. |
| 2005/0074667 | A1 | 4/2005 | Yang |
| 2006/0078787 | A1 | 4/2006 | Sato |
| 2006/0093904 | A1 | 5/2006 | Cheon et al. |
| 2006/0204841 | A1 * | 9/2006 | Satoh et al. ................... 429/161 |
| 2006/0228620 | A1 | 10/2006 | Martinson et al. |
| 2007/0009785 | A1 * | 1/2007 | Kozuki et al. ................... 429/53 |
| 2007/0212595 | A1 * | 9/2007 | Kim et al. ....................... 429/53 |
| 2009/0061310 | A1 | 3/2009 | Kim |
| 2009/0186269 | A1 | 7/2009 | Kim et al. |

FOREIGN PATENT DOCUMENTS

| JP | 02-165873 | 6/1990 |
| JP | 02-288063 | 11/1990 |
| JP | 04-081288 | 3/1992 |
| JP | 05-062956 | 3/1993 |
| JP | 05-078376 | 3/1993 |
| JP | 06-215746 | 8/1994 |
| JP | 06-215747 | 8/1994 |

(Continued)

OTHER PUBLICATIONS

Office Action dated Jul. 10, 2012 for corresponding JP Application No. 2009-267409.

(Continued)

*Primary Examiner* — Helen O Conley

(74) *Attorney, Agent, or Firm* — Knobbe, Martens, Olson & Bear, LLP

(57) ABSTRACT

A rechargeable battery includes: an electrode group including a positive electrode, a negative electrode, and a separator interposed between the positive electrode and the negative electrode; a case housing the electrode group; a cap-up electrically connected with the electrode group and combined with the case; a vent plate installed below the cap-up and having a notch; and a heterogeneous metallic member installed between the cap-up and the vent plate and made of a clad metal, whereby the stability and outputting of the rechargeable battery can be improved.

16 Claims, 9 Drawing Sheets

(56) References Cited

FOREIGN PATENT DOCUMENTS

| | | |
|---|---|---|
| JP | 07-027051 | 5/1995 |
| JP | 07-254401 | 10/1995 |
| JP | 95-027051 | 8/1996 |
| JP | 08-293295 | 11/1996 |
| JP | 10 340714 | 12/1998 |
| JP | 2000-090912 | 3/2000 |
| JP | 2001-126682 | 5/2001 |
| JP | 2001-196047 | 7/2001 |
| JP | 2001-351608 | 12/2001 |
| JP | 2002-170531 | 6/2002 |
| JP | 2003-187773 | 7/2003 |
| JP | 2003-217544 | 7/2003 |
| JP | 2004-139809 | 5/2004 |
| JP | 2004-152697 | 5/2004 |
| JP | 2004-296363 | 10/2004 |
| JP | 2005-174903 | 6/2005 |
| JP | 2006-066269 | 3/2006 |
| JP | 2006-286561 | 10/2006 |
| JP | 2007-194167 | 8/2007 |
| JP | 2007-207453 | 8/2007 |
| JP | 2008-282679 | 11/2008 |
| JP | 2009-193862 | 8/2009 |
| KR | 97-47070 | 7/1997 |
| KR | 1020010056363 | 12/1999 |
| KR | 1020010051870 | 6/2001 |
| KR | 1020010061303 | 7/2001 |
| KR | 1020010101035 | 11/2001 |
| KR | 1020030066243 | 8/2003 |
| KR | 100471966 | 2/2005 |
| KR | 1020070076172 | 1/2006 |
| KR | 1020060022360 | 3/2006 |
| KR | 100579400 | 5/2006 |
| KR | 1020060037595 | 5/2006 |
| KR | 1020060112728 | 11/2006 |
| KR | 1020060118719 | 11/2006 |
| KR | 10-0734758 | 6/2007 |
| KR | 1020070093171 | 9/2007 |
| KR | 1020080007155 | 1/2008 |
| KR | 1020080022945 | 3/2008 |
| KR | 1020080043533 | 5/2008 |

OTHER PUBLICATIONS

Office Action dated Feb. 15, 2012 for corresponding CN Application No. 200910253540.X.
EP Search Report for related EP Application No. 09177456.2-2119, Feb. 2, 2010.
Notice of Allowability for related Korean Application No. 10-2007-0086143, Nov. 28, 2008.
Extended European Search Report dated May 31, 2011 for corresponding EP Application 09252744.9.
Office Action dated Sep. 20, 2012 for corresponding CN Application No. 200910253540.X.
Communication dated Feb. 25, 2013 for corresponding EP Application No. 09 252 744.9-1359.

\* cited by examiner

RECHARGEABLE BATTERY

CROSS-REFERENCE TO RELATED APPLICATION

This application claims priority to and the benefit of Korean Patent Application No. 10-2008-0124113 filed in the Korean Intellectual Property Office on Dec. 8, 2008, the entire contents of which are incorporated herein by reference.

BACKGROUND OF THE INVENTION

1. Field of the Invention

The present invention relates to a rechargeable battery and, more particularly, to a rechargeable battery with an improved structure of a cap assembly.

2. Description of the Related Art

Unlike a primary battery that cannot be recharged, a rechargeable battery (i.e., a secondary battery or a secondary cell) can be repeatedly charged and discharged. A low-capacity rechargeable battery including a single cell is used for small portable electronic devices such as mobile phones, notebook computers, camcorders, and the like. Meanwhile, a large-capacity rechargeable battery in which a plurality of cells are connected in the form of a pack is commonly used as a power source for driving a motor of a hybrid electric vehicle and the like.

Such rechargeable batteries are manufactured to have various shapes, and typical shapes include cylindrical or angular shapes.

The rechargeable batteries may be connected in series to constitute a large-capacity rechargeable battery module so as to be used for driving a motor of electric vehicles and the like that require more power.

The rechargeable battery includes an electrode group (i.e., an electrode assembly) having a positive electrode and a negative electrode positioned with a separator interposed therebetween, a case having a space in which the electrode group is installed, and a cap assembly for sealing the case.

When the rechargeable battery has a cylindrical shape, the positive electrode and negative electrode of the electrode group include an uncoated region without an active material which are disposed in different directions.

A negative electrode current collecting plate is attached to the negative electrode uncoated region, and the positive electrode current collecting plate is attached to the positive electrode uncoated region. The negative electrode current collecting plate is electrically connected to the case, and the positive electrode current collecting plate is electrically connected with the cap assembly to externally induce current. Accordingly, the case serves as a negative electrode terminal, and a cap-up installed at the cap assembly serves as an positive electrode terminal.

When the rechargeable battery is repeatedly charged and discharged, a gas is generated therein, increasing its internal pressure. If the increased pressure within the rechargeable battery is allowed to remain, there is a high possibility that the rechargeable battery may explode. Thus, in order to avoid that, a vent plate with a notch is installed below the cap-up such that it is broken at a certain pressure thereby releasing the excess pressure.

Typically, the cap-up is made of steel with good rigidity, and is formed to be thick to maintain a certain strength. The vent plate is typically formed of an aluminum plate that is relatively thin so as to be easily broken at a pre-set pressure. The cap-up and the vent plate are joined (bonded) through welding, but in this case, the cap-up and the vent plate are not properly welded because their melting temperatures are different.

Namely, if the welding temperature is increased to melt the cap-up, the vent plate can excessively melt to thereby damage the welding portion, and if the welding temperature is low, the cap-up is not properly melted which weakens the strength of the welded portion.

When such defective welding occurs, high resistance is generated from the welding portion which may degrade output, and the welding portion may be more easily broken due to an external impact or the like which can cause the rechargeable battery to fail to transmit current.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rechargeable battery having advantages of improving reliability and stability.

An exemplary embodiment of the present invention provides a rechargeable battery including: an electrode group including a positive electrode, a negative electrode, and a separator interposed between the positive electrode and the negative electrode; a case housing the electrode group; a cap-up electrically connected with the electrode group and combined with the case; a vent plate installed below the cap-up and having a notch; and a heterogeneous metallic member installed between the cap-up and the vent plate and made of a clad metal.

The heterogeneous metallic member may have a ring shape or a disk shape. A plurality of heterogeneous metallic members may be installed.

A recess may be formed at the cap-up, in which the heterogeneous metallic member is inserted.

The heterogeneous metallic member may include a nickel layer and an aluminum layer, and the nickel layer may be in contact with the cap-up and the aluminum layer may be in contact with the vent plate.

The cap-up may be made of steel, the vent plate may be made of aluminum, and the vent plate and the heterogeneous metallic member, and the heterogeneous metallic member and the cap-up, may be joined through resistance welding, respectively.

The cap-up may include a girth portion formed to be continuous along its circumference and having a flat plate shape and an external terminal protruded from the girth portion, wherein an exhaust hole may be formed at the side of the external terminal, and the heterogeneous metallic member may be installed to be in contact with the girth portion.

A welded portion formed through resistance welding may be formed at a position where the heterogeneous metallic member is installed, and the rechargeable battery may further include: a lead member electrically connected with the electrode group; a sub-plate attached to a protrusion protruded downwardly from the vent plate; and a cap-down disposed between the vent plate and the sub-plate and having the lead member attached thereto.

An insulating material may be installed between the vent plate and the cap-down, an auxiliary plate with an outer hole may be disposed between the cap-up and the vent plate, and the heterogeneous metallic member may be inserted into the outer hole so as to be installed. The auxiliary plate may have a ring shape.

The heterogeneous metallic member may be installed between the cap-up and the vent plate to easily join the cap-up and the vent plate through welding. According to the embodiments of the present invention, contact resistance between the cap-up and the vent player is reduced to improve the overall output of the rechargeable battery, and an increase in strength of the welded portion prevents the welded portion from being broken by an external impact or vibration to thus improve stability of the rechargeable battery.

In addition, because the recess is formed at the cap-up or at the vent plate and the heterogeneous metallic member is insertedly installed in the recess, the weldability can be further improved and an increase in volume of the battery can be prevented.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
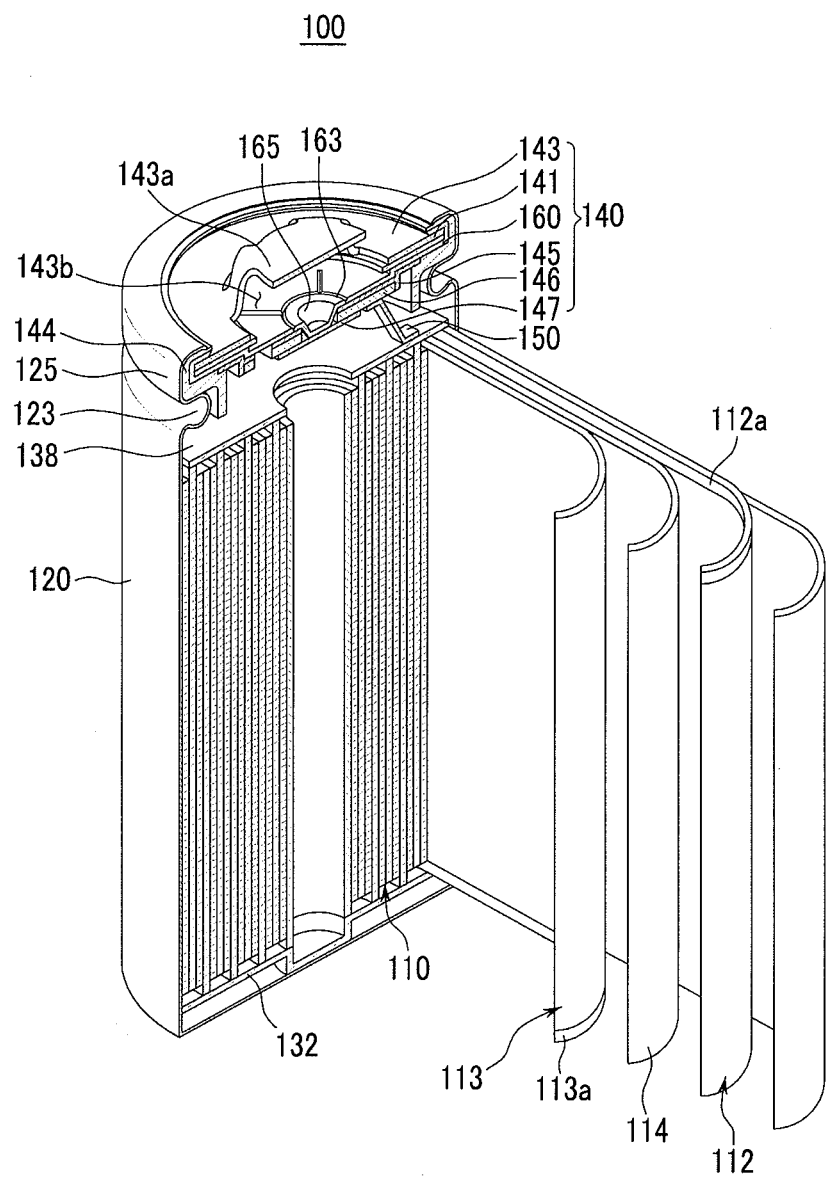
FIG. 1 is a sectional perspective view of a rechargeable battery according to a first exemplary embodiment of the present invention.
Figure 2:
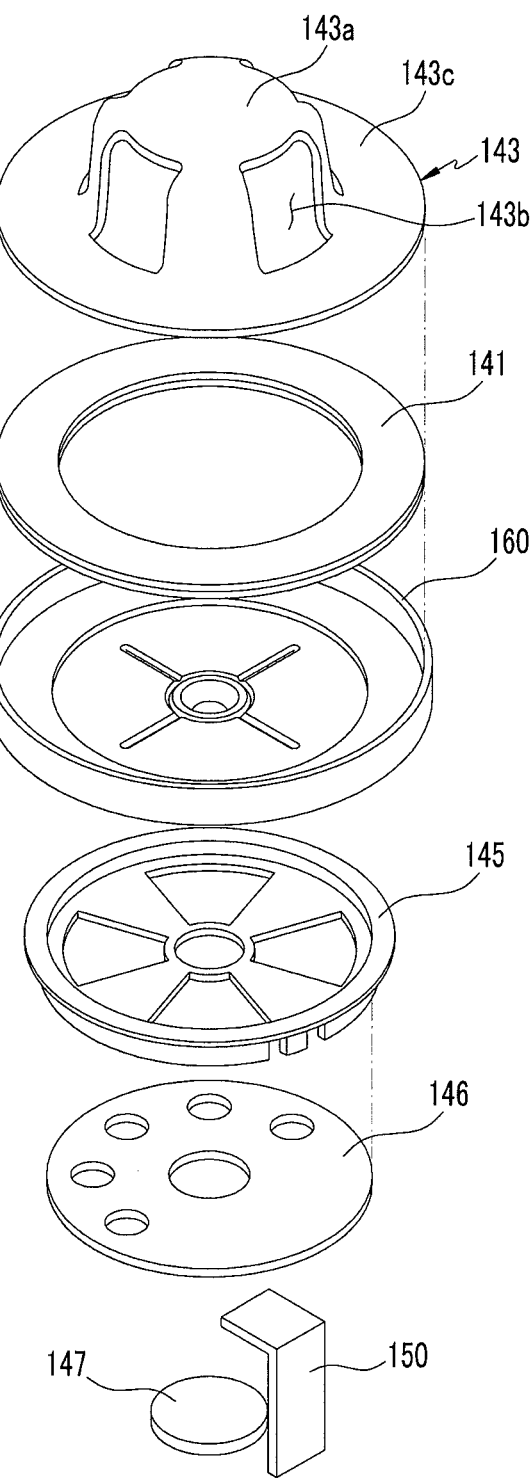
FIG. 2 is an exploded perspective view of a cap assembly according to the first exemplary embodiment of the present invention.

FIG. 1 is a sectional perspective view of a rechargeable battery according to a first exemplary embodiment of the present invention, and FIG. 2 is an exploded perspective view of a cap assembly according to the first exemplary embodiment of the present invention.

With reference to FIGS. 1 and 2, a rechargeable battery 100 according to an exemplary embodiment of the present invention includes an electrode group 110 including a positive electrode 112 and a negative electrode 113 positioned with a separator 114 interposed therebetween, and a case 120 having an opening formed at one front end to receive the electrode group 110 together with an electrolyte. A cap assembly 140 is installed at the opening of the case 120 by the medium of a gasket 144 to seal the case 120.

In more detail, the case 120 is made of a conductive metal such as aluminum, an aluminum alloy, or nickel-plated steel.

The case 120 according to the present exemplary embodiment has a cylindrical shape with an internal space in which the electrode group 110 is positioned. The cap assembly 140 is inserted into the case 120 and fixedly clamped, and in this process, a beading portion 123 and a clamping portion 125 are formed.

The electrode group 110 according to the present exemplary embodiment is configured such that the positive electrode 112, the separator 114, and the negative electrode 113 are stacked and wound in a jelly-roll form into a cylinder, but the structure of the electrode group is not necessarily limited thereto and the electrode group may have any structure.

A positive electrode uncoated region 112a, on which a positive electrode active material is not coated, is formed at an upper end of the positive electrode 112 and electrically connected with a positive electrode current collecting plate 138. A negative electrode uncoated region 113a, on which a negative electrode active material is not coated, is formed at a lower end of the negative electrode 113 and electrically connected with a negative electrode current collecting plate 132.

The negative electrode 113 is configured such that a negative electrode active material is coated on a current collector made of copper or aluminum, and the positive electrode 112 is configured such that the positive electrode active material is coated on a current collector made of aluminum.

The negative electrode active material may be made of a carbon-based active material, and the positive electrode active material may be made of a carbon-based active material, a manganese-based active material, or a ternary active material.

The cap assembly 140 includes a cap-up 143 having a protruded external terminal 143a and exhaust holes 143b, and a vent plate 160 installed below the cap-up 143 and having a notch 163 to be broken at a pre-set pressure condition to discharge gas.

The cap-up 143 is made of steel, the external terminal 143a is protruded from a flat girth portion 143c, and the exhaust holes 143b are formed at the side of the external terminal 143a.

The vent plate 160 is made of aluminum and serves to cut off an electrical connection between the electrode group 110 and the cap-up 143 at the pre-set pressure condition.

A heterogeneous metallic member 141 is installed between the cap-up 143 and the vent plate 160. As shown in FIG. 2, the heterogeneous metallic member 141 has a ring shape and serves to improve weldability between the cap-up 143 and the vent plate 160.

The heterogeneous metallic member 141 is in contact with the girth portion 143c of the cap-up 143 and the vent plate 160, to stably fix the cap-up 143 and the vent plate 160 when they are joined through welding.

A convex portion 165 is formed to be protruded downwardly at the center of the vent plate 160, and a sub-plate 147 is attached to a lower surface of the convex portion 165 through welding.

A cap-down 146 is installed between the vent plate 160 and the sub-plate 147. The cap-down 146 has a disk form and includes a hole formed at the center into which the convex portion 165 can be inserted.

An insulating member 145 is installed between the cap-down 146 and the vent plate 160 to insulate the cap-down 146 from the vent plate 160.

Accordingly, the convex portion 165 of the vent plate 160 is easily joined with the sub-plate 147 through the holes.

The sub-plate 147 is welded to the convex portion 165 and the cap-down 146, and the cap-down 146 is electrically connected with the electrode group 110 via a lead member 150.

Current collected at the electrode group 110 is transferred to the vent plate 160 sequentially through the lead member 150, the cap-down 146, and the sub-plate 147, and the vent plate 160 is joined with the cap-up 143 to allow the current to be transferred to the external terminal 143a of the cap-up 143.

When the pressure within the battery increases, the convex portion 165 and the sub-plate 147 are separated to cut off current.

Figure 3:
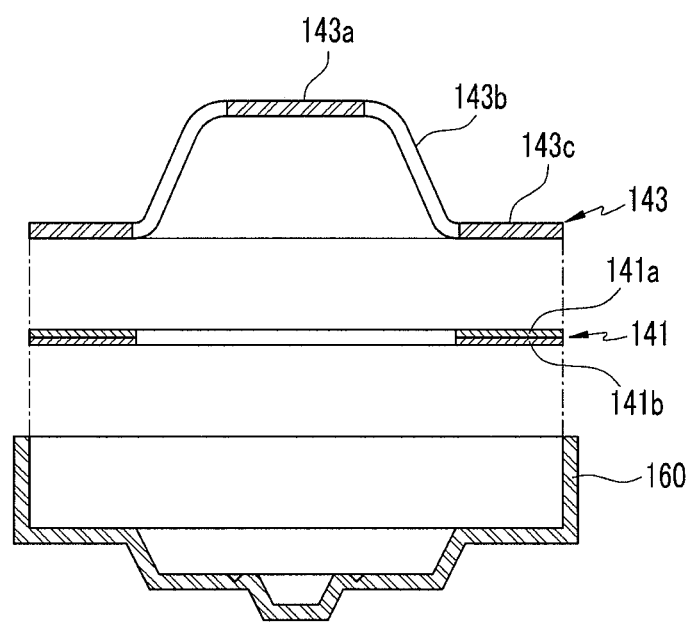
FIG. 3 is an exploded sectional view showing a portion of the cap assembly according to the first exemplary embodiment of the present invention.
Figure 4:
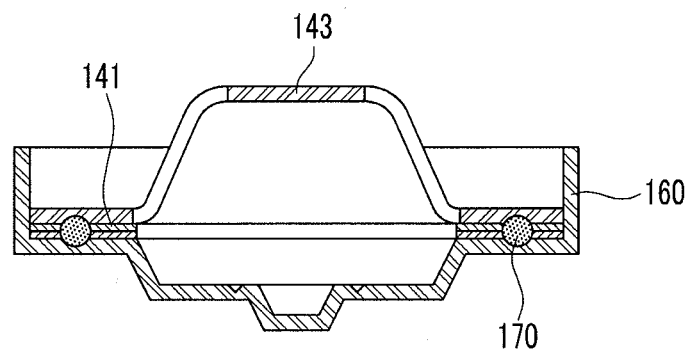
FIG. 4 is a sectional view showing a state in which members in FIG. 3 are joined by welding.

FIG. 3 is an exploded sectional view showing a portion of the cap assembly according to the first exemplary embodiment of the present invention, and FIG. 4 is a sectional view showing a state in which members in FIG. 3 are joined by welding.

With reference to FIGS. 3 and 4, first, the cap-up 143, the heterogeneous metallic member 141, and the vent plate 160 are sequentially stacked, and then the cap-up 143 and the vent plate 160 are welded through resistance welding. The heterogeneous metallic member 141 is made of a clad metal and has a structure in which a nickel layer 141a made of nickel and an aluminum layer 141b made of aluminum are joined. But this is merely illustrative, and the heterogeneous metallic member 141 may be made of various materials.

The heterogeneous metallic member 141 has a ring shape and is installed to be in contact with the flat girth portion 143c of the cap-up 143 and an outer edge of the vent plate 160.

The cap-up 143 is made of steel and the vent plate 160 is made of aluminum. The cap-up 143 and the vent plate 160 have different melting points, making it difficult to join them through welding, so there is a high possibility of defective bonding when they are welded. The heterogeneous metallic member 141 serves to improve weldability of the cap-up 143 and the vent plate 160 between the cap-up 143 and the vent plate 160. That is, the nickel layer 141a has a similar melting point to steel and the aluminum layer 141b has the same melting point as the aluminum of the vent plate 160, so the heterogeneous metallic member 141 can easily join the cap-up 143 and the vent plate 160 through welding.

In a state in which the heterogeneous metallic member 141 is interposed between the cap-up 143 and the vent plate 160, a welded portion 170 is formed through resistance welding, and in this case, the welded portion 170 is formed at a part where a heterogeneous metallic member 141 is installed.

Accordingly, contact resistance between the cap-up 143 and the vent plate 160 is reduced, and thus an overall output of the rechargeable battery can be improved.

In addition, because the degree of strength of the welded portion 170 increases, the welded portion 170 can be prevented from being broken by an external impact or vibration, and thus the stability of the rechargeable battery can be improved.

Figure 5:
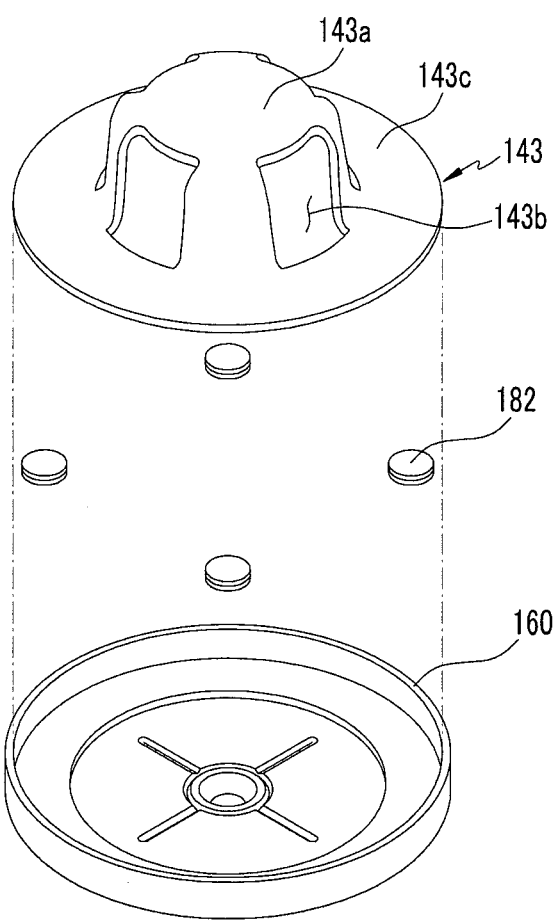
FIG. 5 is an exploded perspective view showing a portion of the cap assembly according to a second exemplary embodiment of the present invention.

FIG. 5 is an exploded perspective view showing a portion of the cap assembly according to a second exemplary embodiment of the present invention.

A rechargeable battery according to the second exemplary embodiment of the present invention has the same structure as that of the first exemplary embodiment of the present invention, except for the heterogeneous metallic member 182 and the cap-up 143, so repeated descriptions of the same structures will be omitted.

With reference to FIG. 5, a plurality of heterogeneous metallic members 182 are installed between the cap-up 143 and the vent plate 160, and have a substantially circular shape.

The cap-up 143 is made of steel, and includes the flat girth portion 143c formed along the circumference, the external terminal 143a protruded from the girth portion 143c, and the exhaust holes 143b formed at the side of the external terminal 143a.

The heterogeneous metallic members 182 are tightly attached to the girth portion 143c, and the diameter of the heterogeneous metallic members 182 is smaller than the width of the girth portion 143c.

Figure 6:
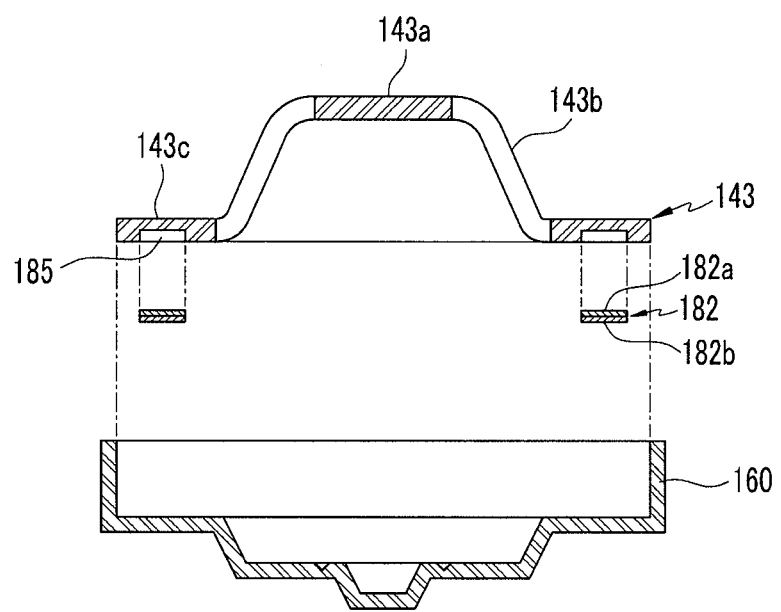
FIG. 6 is an exploded sectional view showing a portion of the cap assembly according to a second exemplary embodiment of the present invention.
Figure 7:
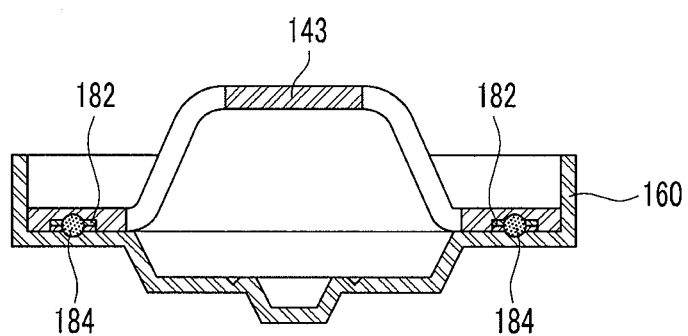
FIG. 7 is a sectional view showing a state in which members in FIG. 6 are joined by welding.

FIG. 6 is an exploded sectional view showing a portion of the cap assembly according to a second exemplary embodiment of the present invention, and FIG. 7 is a sectional view showing a state in which members in FIG. 6 are joined by welding.

With reference to FIGS. 6 and 7, a plurality of recesses 185 are formed on a lower surface of the girth portion 143c of the cap-up 143, and the heterogeneous metallic members 182 are inserted into the recesses 185 and tightly attached to the cap-up 143 and the vent plate 160. The heterogeneous metallic members 182 are configured such that a nickel layer 182a made of nickel and an aluminum layer 182b made of aluminum are bonded at upper and lower portions thereof. The nickel layer 182a is in contact with the cap-up 143, and the aluminum layer 182b is in contact with the vent plate 160.

In this state, the cap-up 143 and the vent plate 160 are bonded through resistance welding to form welded portions 184. The welded portions 184 are formed at the part where the heterogeneous metallic members 182 are installed.

Because the heterogeneous metallic members 182 are formed in the small disk shape, the heterogeneous metallic members 182 are installed only at the parts where welding is performed, so the cap-up 143 and the vent plate 160 can be easily bonded. Also, because the size of the heterogeneous metallic members 182 is minimized, weldability can be improved without increasing the size of the rechargeable battery.

In addition, melting is performed within the recesses, preventing heat generated within the recesses from being released, so the welding can be more easily performed.

Figure 8:
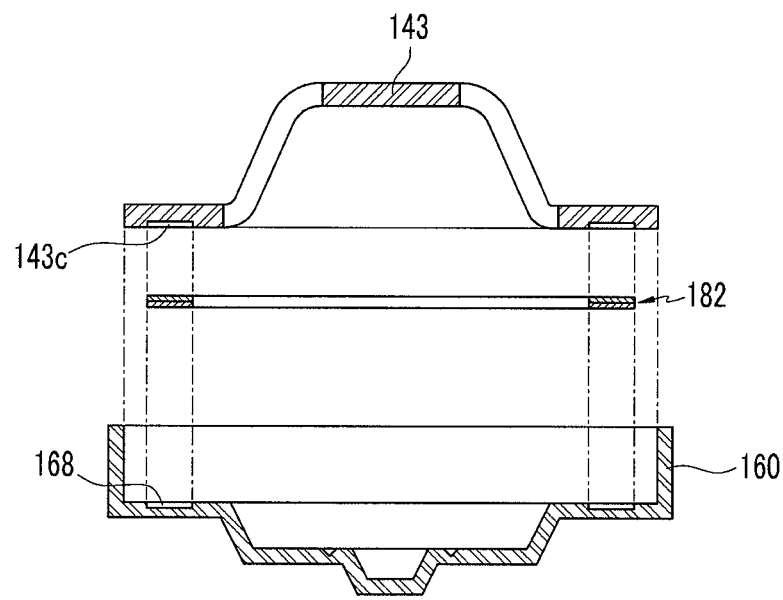
FIG. 8 is an exploded perspective view showing a portion of the cap assembly according to a third exemplary embodiment of the present invention.
Figure 9:
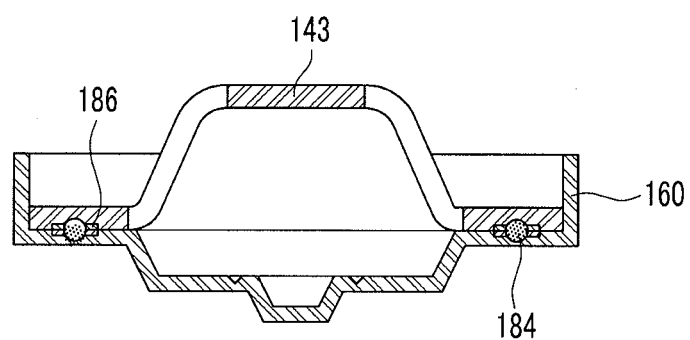
FIG. 9 is a sectional view showing a state in which members in FIG. 8 are joined by welding.

FIG. 8 is an exploded perspective view showing a portion of the cap assembly according to a third exemplary embodiment of the present invention, and FIG. 9 is a sectional view showing a state in which members in FIG. 8 are joined by welding.

A rechargeable battery according to the third exemplary embodiment of the present invention has the same structure as that of the second exemplary embodiment of the present invention, except for the structure of the vent plate 160, so repeated descriptions of the same structures will be omitted.

With reference to FIGS. 8 and 9, a plurality of heterogeneous metallic members 182 are installed between the cap-up 143 and the vent plate 160, and they have a substantially circular shape.

A plurality of recesses 185 are formed on the lower surface of the girth portion 143c of the cap-up 143, into which the heterogeneous metallic members 182 are inserted, and a plurality of recesses 168 are also formed on the edge of the upper surface of the vent plate 160, into which the heterogeneous metallic members 182 are inserted.

Upper portions of the heterogeneous metallic members 182 are inserted into the recesses 185 formed at the girth portion 143c, and lower portions of the heterogeneous metallic members 182 are inserted into the recesses 168 formed at the vent plate 160.

With the heterogeneous metallic members 182 insertedly positioned in the recesses 168 and 185, the cap-up 143 and the vent plate 160 are bonded through welding, and accordingly, the welded portions are formed where the heterogeneous metallic members 182 are positioned.

In the present exemplary embodiment, the recesses are illustrated to be formed both on the cap-up 143 and on the vent plate 160, but the present invention is not limited thereto and the recesses may be formed only on the vent plate 160.

Figure 10:
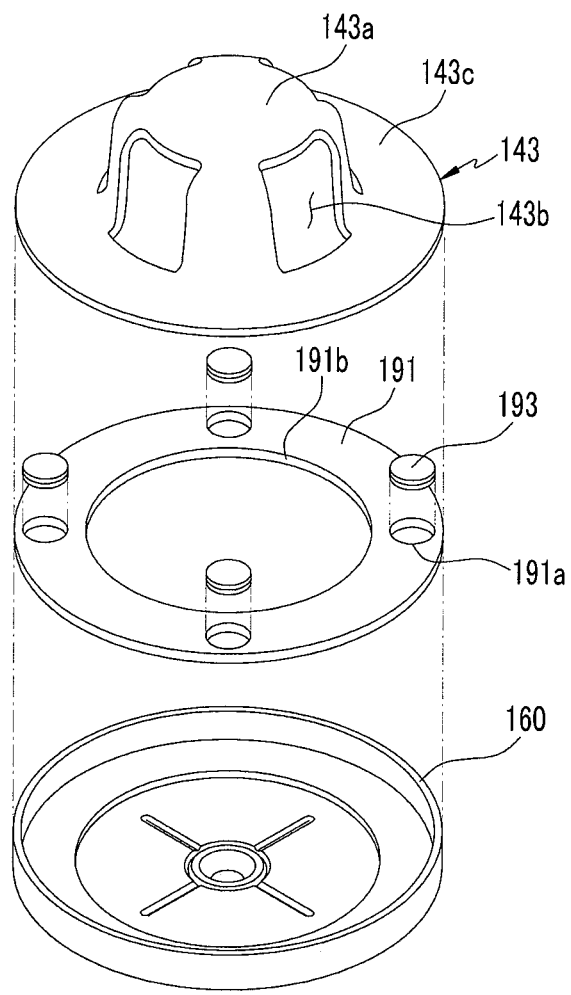
FIG. 10 is an exploded perspective view showing a portion of the cap assembly according to a fourth exemplary embodiment of the present invention.

FIG. 10 is an exploded perspective view showing a portion of the cap assembly according to a fourth exemplary embodiment of the present invention.

A rechargeable battery according to the fourth exemplary embodiment of the present invention has the same structure as that of the first exemplary embodiment of the present invention, except for a heterogeneous metallic member 193 and an additionally installed auxiliary plate 191, so repeated descriptions of the same structures will be omitted.

With reference to FIG. 10, the heterogeneous metallic members 193 and the auxiliary plate 191 are installed between the cap-up 143 and the vent plate 160.

The auxiliary plate 191 has a ring shape with a central hole 191b formed therein, and a plurality of outer holes 191a are separately formed along a circumferential direction of the auxiliary plate 191. The heterogeneous metallic members 193 have a disk shape and are insertedly installed in the outer holes 191a.

The cap-up 143 is made of steel, and includes the flat girth portion 143c formed along the circumference, the external terminal 143a protruded from the girth portion 143c, and the exhaust holes 143c formed at the side of the external terminal 143a.

Figure 11:
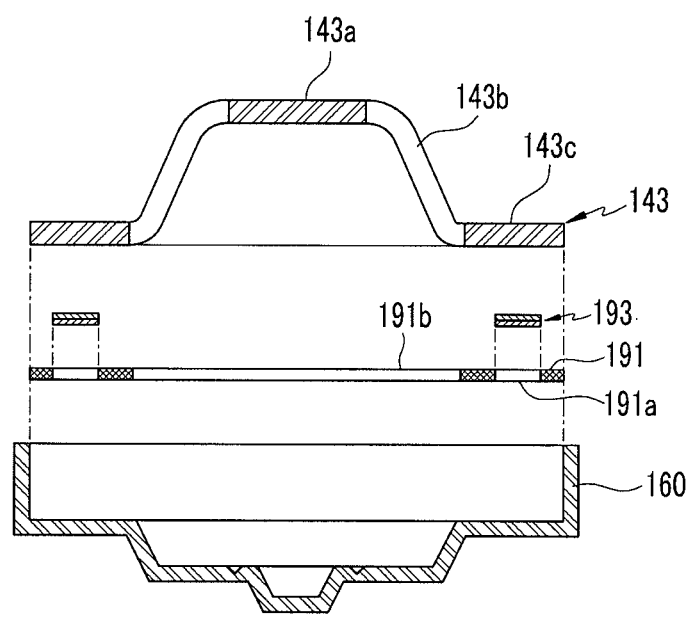
FIG. 11 is an exploded sectional view showing a portion of the cap assembly according to the fourth exemplary embodiment of the present invention.
Figure 12:
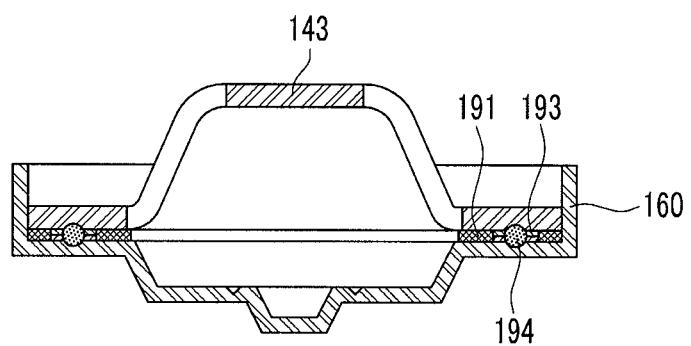
FIG. 12 is a sectional view showing a state in which members in FIG. 11 are joined by welding.

FIG. 11 is an exploded sectional view showing a portion of the cap assembly according to the fourth exemplary embodiment of the present invention, and FIG. 12 is a sectional view showing a state in which the members in FIG. 11 are joined by welding.

With reference to FIGS. 11 and 12, in a state in which the heterogeneous metallic members 193 are inserted in the outer holes 191a of the auxiliary plate 191, the auxiliary plate 191 is installed between the cap-up 143 and the vent plate 160. In this case, the auxiliary plate 191 is in contact with the girth portion 143c and the edge of the vent plate 160.

In this state, the cap-up 143 and the vent plate 160 are bonded through resistance welding to form welded portions 194 where the heterogeneous metallic members 193 are positioned.

The heterogeneous metallic members 193 are configured such that a nickel layer 193a made of nickel and an aluminum layer 193b made of aluminum are bonded at upper and lower portions thereof. The nickel layer 193a is in contact with the cap-up 143, and the aluminum layer 193b is in contact with the vent plate 160.

Because the auxiliary plate 191 is installed and the heterogeneous metallic members 193 are installed in the outer holes 191a of the auxiliary plate 191, the heterogeneous metallic members 193 can be more easily installed. That is, when the heterogeneous metallic members 193 are formed to be small, it is not easy to install them at predetermined positions. Thus, in the present exemplary embodiment, by providing the auxiliary plate 191 and inserting the heterogeneous metallic members 193 in the outer holes 191a of the auxiliary plate 191, the heterogeneous metallic members 193 can be easily installed at the predetermined positions.

Figure 13:
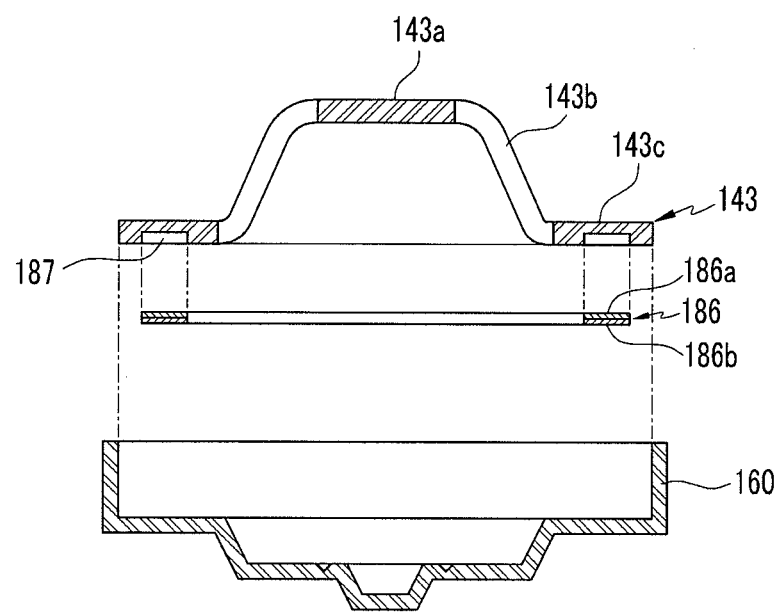
FIG. 13 is an exploded sectional view showing a portion of the cap assembly according to a fifth exemplary embodiment of the present invention.
Figure 14:
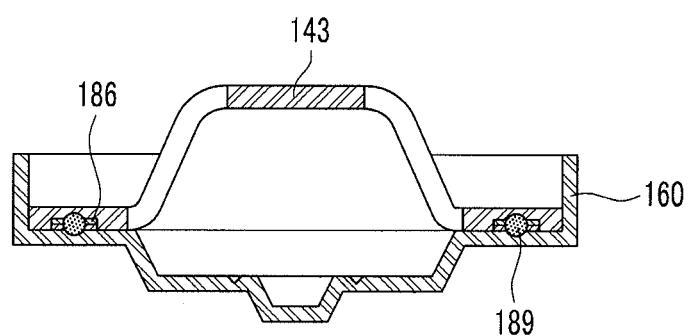
FIG. 14 is a sectional view showing a state in which members in FIG. 13 are joined by welding.

FIG. 13 is an exploded sectional view showing a portion of the cap assembly according to a fifth exemplary embodiment of the present invention, and FIG. 14 is a sectional view showing a state in which the members in FIG. 13 are joined by welding.

A rechargeable battery according to the fifth exemplary embodiment of the present invention has the same structure as that of the first exemplary embodiment of the present invention, except for the structure of heterogeneous metallic members 186 and the cap-up 143, so repeated descriptions of the same structures will be omitted.

With reference to FIGS. 13 and 14, the heterogeneous metallic members 186 are installed between the cap-up 143 and the vent plate 160.

The heterogeneous metallic member 186 has a ring shape with an empty central portion. The heterogeneous metallic members 186 are configured such that a nickel layer 186a made of nickel and an aluminum layer 186b made of aluminum are bonded at upper and lower portions thereof. The nickel layer 186a is in contact with the cap-up 143, and the aluminum layer 186b is in contact with the vent plate 160.

The cap-up 143 is made of steel, and the vent plate 160 is made of aluminum. The cap-up 143 includes the girth portion 143c formed to be continuous along the circumference and having a flat plate form, the external terminal 143a protruded from the girth portion 143c, and the exhaust holes 143b formed at the side of the external terminal 143a. Recesses 184 are formed at the girth portion 143c, into which the heterogeneous metallic members 186 are installed. The recesses 184 have annular cross-sections corresponding to the heterogeneous metallic members 186, to facilitate inserting of the heterogeneous metallic members 186.

The heterogeneous metallic members 186 are inserted into the recesses 187 when the cap-up 143 and the vent plate 160 are tightly attached. In this state, the cap-up 143 and the vent plate 160 are bonded through resistance welding, and welded portions 189 are formed where the heterogeneous metallic members are positioned.

Because the recesses 187 are formed at the cap-up 143 and the heterogeneous metallic members 186 are insertedly installed in the recesses 187, the cap-up 143 and the vent plate 160 can be easily bonded without increasing the volume of the rechargeable battery. In addition, because the heterogeneous metal members 186 have the ring shape, the cap-up 143 and the vent plate 160 can be stably bonded by increasing the number of welded portions 189.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode group comprised of a positive electrode, a negative electrode, and a separator interposed between the positive electrode and the negative electrode;
   a case housing the electrode group;
   a cap-up electrically connected with the electrode group and combined with the case wherein the cap-up comprises a girth portion formed to be continuous along its circumference and having a flat plate shape, and an external terminal protruded from the girth portion, wherein an exhaust hole is formed at the side of the external terminal;

a vent plate installed below the cap-up and comprising a notch; and a plurality of disk shaped heterogeneous metallic members installed between the cap-up and the vent plate and made of a clad metal adjacent the girth portion of the cap-up wherein the plurality of disk shaped heterogeneous metallic members have a diameter smaller than the width of the girth portion, wherein a plurality of recesses are formed at the cap-up to allow the plurality of disk shaped heterogeneous metallic members to be inserted therein.

2. The rechargeable battery of claim 1, wherein the heterogeneous metallic member has a ring shape.

3. The rechargeable battery of claim 2, wherein a recess is formed at the cap-up to allow the heterogeneous metallic member to be inserted therein.

4. The rechargeable battery of claim 2, wherein a recess is formed at the vent plate to allow the heterogeneous metallic member to be inserted therein.

5. The rechargeable battery of claim 1, wherein each of the heterogeneous metallic members comprises a nickel layer and an aluminum layer, and the nickel layer is in contact with the cap-up and the aluminum layer is in contact with the vent plate.

6. The rechargeable battery of claim 5, wherein the cap-up is made of steel and the vent plate is made of aluminum.

7. The rechargeable battery of claim 6, wherein the vent plate and the plurality of heterogeneous metallic members, and the plurality of heterogeneous metallic members and the cap-up, are joined through resistance welding, respectively.

8. The rechargeable battery of claim 7, wherein a welded portion formed according to the resistance welding is formed at a position where the plurality of heterogeneous metallic members is installed.

9. The rechargeable battery of claim 1, further comprising:
a lead member electrically connected with the electrode group;
a sub-plate attached to a protrusion protruded downwardly from the vent plate; and
a cap-down disposed between the vent plate and the sub-plate and having the lead member attached thereto.

10. The rechargeable battery of claim 9, wherein an insulating material is installed between the vent plate and the cap-down.

11. The rechargeable battery of claim 1, wherein an auxiliary plate with an outer hole is disposed between the cap-up and the vent plate, and the heterogeneous metallic member is inserted into the outer hole so as to be installed.

12. The rechargeable battery of claim 11, wherein the auxiliary plate has a ring shape.

13. A rechargeable battery comprising:
an electrode group;
a case housing the electrode group;
a cap-up electrically connected with the electrode group and positioned on the case wherein the cap-up includes a mounting surface formed of a first material having a first melting temperature;
a vent plate installed below the cap-up wherein the vent plate defines a notch and wherein the vent plate includes a mounting surface formed of a second material having a second melting temperature lower than the first melting temperature;
a plurality of disk shaped coupling members that are interconnected between the mounting surfaces of the vent plate and the cap-up, wherein each of the plurality of coupling members has a first layer that is formed of a first material which has a third melting temperature and a second layer that is formed of a second material that has a fourth melting temperature wherein the first material is welded to the cap-up and the third melting temperature is higher than the fourth melting temperature and the second layer is heat coupled to the vent plate and wherein the plurality of disk shaped coupling members have a diameter smaller than the width of the mounting surface of the vent plate wherein a plurality of recesses are formed at the cap-up to allow the plurality of disk shaped heterogeneous metallic members to be inserted therein.

14. The battery of claim 13, wherein the coupling member is a heterogeneous metallic member having a ring shape.

15. The battery of claim 13, wherein each of the plurality of coupling members comprises a nickel layer and an aluminum layer wherein the nickel layer is in contact with the cap up and the aluminum layer is in contact with the vent plate.

16. The rechargeable battery of claim 13, further comprising:
a lead member electrically connected with the electrode group;
a sub-plate attached to a protrusion protruded downwardly from the vent plate; and
a cap-down disposed between the vent plate and the sub-plate and having the lead member attached thereto.

* * * * *